United States Patent [19]
Kiesel et al.

[11] Patent Number: 4,777,404
[45] Date of Patent: Oct. 11, 1988

[54] HALOGEN INCANDESCENT LAMP WITH SINGLE HALOGENATED HYDROCARBON FILL COMPONENT

[75] Inventors: Rolf Kiesel, Aalen; Karl Blum, Söhnstetten, both of Fed. Rep. of Germany

[73] Assignee: Patent Treuhand Gesellschaft für elektrische Glühlampen mbH, Munich, Fed. Rep. of Germany

[21] Appl. No.: 27,632

[22] Filed: Mar. 18, 1987

[30] Foreign Application Priority Data

Mar. 24, 1986 [DE] Fed. Rep. of Germany ....... 3610922

[51] Int. Cl.$^4$ ............................................. H01K 1/50
[52] U.S. Cl. ..................................... 313/579; 252/372
[58] Field of Search ..................... 313/579; 570/101; 585/2, 6; 252/581, 372

[56] References Cited

U.S. PATENT DOCUMENTS

3,551,722 12/1970 Holcomb et al. ................. 313/579
3,644,773 2/1972 Coaton et al. .................... 313/579

FOREIGN PATENT DOCUMENTS

1327479 8/1973 United Kingdom .

Primary Examiner—David K. Moore
Assistant Examiner—K. Wieder
Attorney, Agent, or Firm—Frishauf, Holtz, Goodman & Woodward

[57] ABSTRACT

To prevent carburation of a tungsten filament, the fill within the bulb is formed by an inert gas, for example xenon or krypton, and an additive which is formed by a single halogenated hydrocarbon in which iodine is bound, and further includes at least one atom of bromine or chlorine; suitable additives are: $CH_2ClI$, $CHCl_2I$, $CHClI_2$, $CHClBrI$, $CH_2BrI$, present in from between about $1\times10^{-8}$ to $5\times10^{-6}$ mol per $cm^3$ of the internal volume of the bulb; particularly preferred are chlor iodine methane ($CH_2ClI$), present in about $1-3\times10^{-7}$ mol per $cm^3$ of the internal volume of the bulb.

13 Claims, 1 Drawing Sheet

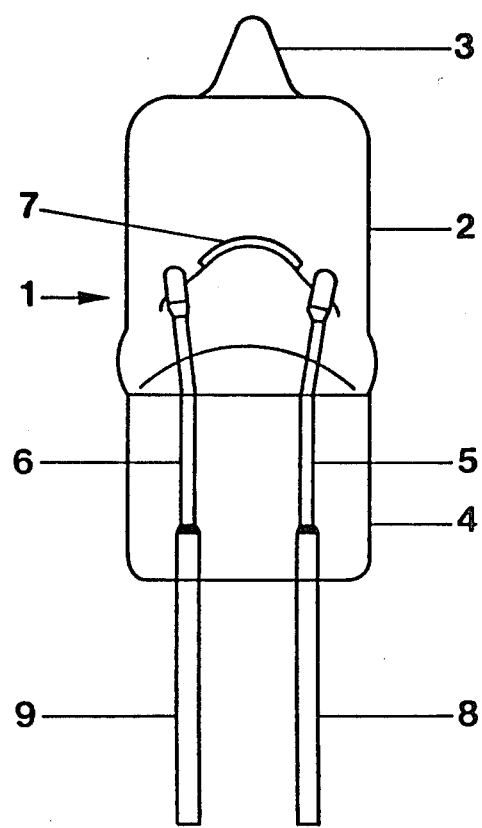

HALOGEN INCANDESCENT LAMP WITH SINGLE HALOGENATED HYDROCARBON FILL COMPONENT

Reference to related disclosures:
U.S. Pat. No. 3,644,773, Coaton et al.
British Pat. No. 1,327,479.

The present invention relates to halogen incandescent lamps, and more particularly to such lamps which contain a fill of inert gas with an additive in the form of one or more halogenated hydrocarbons and, if appropriate, other halogenated compounds.

BACKGROUND

Halogen incandescent lamps usually have a transparent bulb or vessel which is closed off to be vacuum-tight and within which one or more filaments of tungsten are retained. The bulb further retains a fill which includes an inert gas and an additive. The additive customarily is in the form of one or more halogenated hydrocarbons. If desired, other halogen containing compounds may be added. The halogens usually are iodine and bromine and/or chlorine.

It is known to reduce blackening of the bulb or vessel by adding halogen-containing additives. This increases the lifetime of incandescent lamps. British Pat. No. 1,327,479 states that advantages can be obtained by the simultaneous use of iodine and another halogen in the form of suitable partially halogenized hydrocarbons. An iodine compound which is preferred for manufacturing reasons is $CH_3I$, (methyl iodide) as described in U.S. Pat. No. 3,644,773. These additives require a comparatively high proportion of the halogen containing substance in the fill due to relatively high presence of hydrogen—with respect to the halogen content. About 1% of the inert gas is formed by the halogen containing substances in the fill. This is necessary in order to permit the tungsten - halogen cycle to continue in suitable manner, and thereby insure long-time operation of the lamp without blackening of the bulb. The fill, necessarily, also introduces a comparatively high proportion of carbon into the bulb of the lamp. Carbon precipitates on the filament, which is of tungsten, and, by carburization of the tungsten, leads to the filament becoming brittle. Particularly lamps having a small diameter of the filament then have reduced resistance to shock or vibration. Further, use of $CH_3I$ has undesirable consequences from a health point of view; it has been found that $CH_3I$ has a tendency to cause cancer, i.e. to be carcinogenic.

THE INVENTION

It is an object to provide a halogen incandescent lamp in which the tendency to carburization of the filament is effectively inhibited without, however, interfering with the lifetime of the halogen lamp, while, further, reducing any health risks which might be caused by the presence of $CH_3I$ in the manufacturing environment.

Briefly, the lamp has as an addition to the inert gas a single halogenated hydrocarbon in which iodine is bound. This hydrocarbon, simultaneously, includes at least a further halogen atom consisting of either chlorine and bromine, or both chlorine and bromine.

The fill of the lamp, thus, will have a much smaller hydrogen content of the halogen containing substances than the prior art, and permit substantially more economical dosing of the additive, and thus results in a markedly decreased content of carbon in the fill, thereby substantially increasing the reliability of the lamp by increasing its resistance to impacts, vibrations, and shock. The dosing, or quantity of application is only about 10 to 1000 parts per million—by volume—of the halogen-containing substance.

Lamps which in the past have used two hydrocarbons as the single halogen containing additives, of which one hydrocarbon contained iodine and the other chlorine or bromine, can now be made in identical structure but using only a single hydrocarbon which contains iodine and chlorine or bromine, respectively, or both. This permits substantial simplification in the filling process step during manufacture of the lamp. It is not necessary to utilize expensive and complex dosing and mixing steps or methods. The time required to carry out the fill step is reduced and the danger of contamination due to spurious outside gas is substantially decreased.

In accordance with a feature of the invention, the carbon content can be held at a very low level when using methane derivatives. The absolute concentration—corresponding, for example, to the above-given relative concentration—is, preferably, between about $1 \times 10^{-8}$ to $5 \times 10^{-6}$ mol per $cm^3$ of the volume of the bulb or fill vessel. Using a lower halogen content could not completely bind tungsten evaporated from the coil filament, and thus might lead to blackening of the bulb or fill vessel. A higher content of halogen would lead to an increased recombination of tungsten. This would increase the axial transport in the region of the filament and then also would decrease the overall lifetime of the coil filament.

Most types of halogen incandescent lamps utilize a portion of iodine and a ligher halogen, such as chlorine or bromine, of 1:2 to 2:1. Most frequently, a proportion of 1:1 is needed. It is particularly desirable to utilize a halogenated hydrocarbon with the corresponding proportion between chlorine or bromine, respectively, and iodine, preferably in the proportion of 1:1. The simplest hydrocarbon of this type is the methane derivative chloriodine methane $CH_2ClI$. Excellent results are obtained with an absolute concentration of $1-3 \times 10^{-7}$ mol per $cm^3$ volume of the bulb or vessel.

DRAWING

The single FIGURE shows, schematically, a halogen incandescent lamp in accordance with the invention.

DETAILED DESCRIPTION

The halogen incandescent lamp 1 has a bulb 2 of hard glass or quartz glass. A typical diameter is 9 mm, with an inner bulb volume of about 0.25 $cm^3$. The bulb 2 is tipped off, as seen at 3. The bulb 2 is single-ended, that is, at one end a press or pinch seal 4 is formed, which retains two inner current supply leads 5, 6, made of molybdenum, which are vacuum-tightly passed through the pinch or press seal 4 and melted therein. A coiled filament 7 is reatined in stretched condition between the inner portions of the current supply leads. The coiled filament 7 is made of tungsten wire with a diameter of about 40 micrometers.

To insure reliable terminal connections with an external voltage source, two contact pins 8, 9 made of an iron-nickel-chromium alloy are connected to the leads 5, 6. The overall length of the lamp is about 3 cm.

Various types of fills can be used with the lamp of this type, depending on the eventual use of the lamp, its light output and nominal lifetime.

EXAMPLE 1

The lamp is used for a liquid-crystal display (LCD), for energization by 12 V, with a nominal power of 5 W.

Fill: Xenon at a pressure of 13,300 hPa, and an additive of $1.6 \times 10^{-7}$ mol per cm$^3$ CH$_2$ClI.

During an operating time of 3,500 hours, no blackening was found.

EXAMPLE 2

A lamp for a position lamp for boats, with a nominal voltage of 12 V and 5 W.

Fill: Xenon at a pressure of 6,700 hPa, with an additive of $1 \times 10^{-7}$ mol per cm$^3$ CH$_2$ClI.

During an operating time of 600 hours, no blackening was found.

EXAMPLE 3

Low-voltage halogen general service lamp for 12 V, 10 W nominal.

Fill: Xenon at 13,300 hPa, and additive of $1.6 \times 10^{-7}$ mol per cm$^3$ CH$_2$ClJ.

During an operating time of 3,000 hours, no blackening was found.

Comparing the lamps of the present invention to lamps with a conventional fill, for example having a fill of xenon, with an additive of CH$_2$Br$_2$ and CH$_3$I, the defect rate was lowered to between 10% to 20%.

The present invention is not limited to the examples given. The bulb may use, for example, a quartz bulb in which the current leads are connected by melting molybdenum foils through the pinch or press seal. Lamps with more than one filament can be used.

Other suitable inert gases besides xenon are krypton and mixtures thereof which, besides the noble gas, may contain some nitrogen. Besides CH$_2$ClI, use of any one of CHCl$_2$I, CHClI$_2$, CHClBrI and CH$_2$BrI is desirable and advantageous. Under some special conditions, ethane derivatives may be used. That has some advantages in the process of manufacturing the lamp. In addition to the above mentioned halogenated hydrocarbons, other halogen containing substances may also be used, in part.

The precise composition and fill quantity or dosing of the halogen component in the fill gas depends on many factors, particularly on the type of glass, the geometry of the lamp bulb, and operating temperatures. Optimum compositions can readily be determined by a few experiments starting, for instance, from the above-given Examples 1, 2 and 3.

Various other changes and modifications may be made within the scope of the inventive concept.

We claim:

1. Filament-carburization-resistant halogen incandescent lamp (1) having
    a transparent bulb (2) which is sealed and vacuum-tight;
    at least one tungsten filament (7) located in the bulb;
    current lead-ins (5, 6) passing through a press seal (4) of the bulb and supporting said at least one filament; and
    a fill within the bulb, formed by an inert gas and a single halogenated hydrocarbon compound, said compound containing
    iodine and at least one atom selected from the group consisting of chlorine and bromine.

2. The lamp of claim 1, wherein the iodine containing halogenated hydrocarbon forms the only halogen containing additive.

3. The lamp of claim 1, wherein the iodine containing halogenated hydrocarbon comprises a methane derivative.

4. The lamp of claim 3, wherein the concentration of the halogenated hydrocarbon is $1 \times 10^{-8}$ to $5 \times 10^{-6}$ mol per cm$^3$ of the internal volume of said bulb (2).

5. The lamp of claim 2, wherein the iodine containing halogenated hydrocarbon comprises chlor - iodine methane (CH$_2$ClI).

6. The lamp of claim 5, wherein the proportion of chlor - iodine methane (CH$_2$ClI) in the fill comprises $1-3 \times 10^{-7}$ mol per cm$^3$ of the internal volume of the bulb.

7. The lamp of claim 2, wherein the inert gas comprises xenon at a fill pressure of 13,300 hPa, and the halogenated hydrocarbon comprises $1.6 \times 10^{-7}$ mol per cm$^3$ CH$_2$ClI of the internal volume of the bulb (2).

8. The lamp of claim 2, wherein the inert gas comprises xenon at a fill pressure of 6,700 hPa, and the halogenated hydrocarbon comprises $1 \times 10^{-7}$ mol per cm$^3$ CH$_2$ClI of the internal volume of the bulb (2).

9. The lamp of claim 3, wherein said single halongated hydrocarbon comprises at least one of the materials of the group consisting of CH$_2$ClI, CHCl$_2$I, CHClI$_2$, CHClBrI, CH$_2$BrI.

10. The lamp of claim 1, wherein said single halogenated hydrocarbon compound contains both chlorine and bromine.

11. The lamp of claim 1, wherein said hydrocarbon compound contains only one carbon atom.

12. The lamp of claim 1, wherein said single halogenated hydrocarbon compound contains both chlorine and bromine and only one carbon atom.

13. The lamp of claim 1, wherein said single halogenated hydrocarbon compound is an ethane derivative.

* * * * *